(12) United States Patent
White

(10) Patent No.: US 11,609,003 B1
(45) Date of Patent: Mar. 21, 2023

(54) CLOTHES DRYER EXHAUST VENT FOR BUILDING EXTERIOR WALL

(71) Applicant: Gregory White, Vero Beach, FL (US)

(72) Inventor: Gregory White, Vero Beach, FL (US)

( * ) Notice: Subject to any disclaimer, the term of this patent is extended or adjusted under 35 U.S.C. 154(b) by 0 days.

(21) Appl. No.: 17/582,891

(22) Filed: Jan. 24, 2022

Related U.S. Application Data

(63) Continuation-in-part of application No. 17/177,655, filed on Feb. 17, 2021, now Pat. No. 11,519,618.

(51) Int. Cl.
| | |
|---|---|
| *F24F 7/04* | (2006.01) |
| *F16L 37/10* | (2006.01) |
| *F24F 7/00* | (2021.01) |
| *F16L 41/08* | (2006.01) |
| *D06F 58/20* | (2006.01) |

(52) U.S. Cl.
CPC .............. *F24F 7/04* (2013.01); *F16L 37/105* (2013.01); *D06F 58/20* (2013.01); *F16L 41/08* (2013.01); *F24F 2007/001* (2013.01); *F24F 2007/0025* (2021.01); *F24F 2221/18* (2013.01)

(58) Field of Classification Search
USPC ........................................................ 454/367
See application file for complete search history.

(56) References Cited

U.S. PATENT DOCUMENTS

| | | | | | |
|---|---|---|---|---|---|
| 3,233,923 | A | * | 2/1966 | Raider | ..................... F16L 33/24 285/239 |
| 3,596,936 | A | * | 8/1971 | Dieckmann | ............. F16L 59/18 285/423 |
| 4,081,915 | A | * | 4/1978 | Materniak | ................ D06F 58/20 34/235 |
| 4,214,380 | A | * | 7/1980 | Meyer | ..................... F24F 13/18 34/235 |
| 4,811,570 | A | * | 3/1989 | Jennings | ................. F24F 13/24 62/263 |
| 5,444,947 | A | * | 8/1995 | Miller | .................... E04B 1/7076 52/302.1 |

(Continued)

FOREIGN PATENT DOCUMENTS

| | | | | | |
|---|---|---|---|---|---|
| DE | 102014202246 | A1 | * | 8/2015 | ......... B60H 1/00528 |
| DE | 202016105134 | | * | 1/2018 | ................ F24F 7/00 |

(Continued)

*Primary Examiner* — Edelmira Bosques
*Assistant Examiner* — Frances F. Hamilton
(74) *Attorney, Agent, or Firm* — Malin Haley DiMaggio & Bowen, P.A.

(57) ABSTRACT

A clothes dryer exhaust vent (dryer vent) and the method of installation in a residential or commercial building exterior foundation wall, during construction of a building, to save the expense and costs of a clothes dryer exhaust vent installation after a building has been constructed, to reduce repair and additional construction costs. The dryer vent has a rigid wall mounting plate (plastic or metal) that is mounted in the construction block array of an exterior building foundation wall while the wall is under construction. The clothes dryer exhaust vent includes a clothes dryer exhaust vent tube connected through the rigid, wall mounting plate (manually removable), an exterior (outdoors) hemispherical-shaped clothes dryer vent open end cover assembly, manually removable for cleaning and removing lint, said cover assembly including a clothes dryer exhaust vent flapper valve.

7 Claims, 12 Drawing Sheets

(56) References Cited

U.S. PATENT DOCUMENTS

| | | | | | |
|---|---|---|---|---|---|
| 5,460,572 | A | * | 10/1995 | Waltz | E04B 1/7076 52/302.1 |
| 5,482,507 | A | * | 1/1996 | Priest | F24F 13/075 34/235 |
| 5,487,701 | A | * | 1/1996 | Schedegger | F24F 13/08 52/302.1 |
| 5,496,213 | A | * | 3/1996 | Miller | E04G 15/02 52/302.1 |
| 5,651,732 | A | * | 7/1997 | Dufour | F23J 13/04 126/307 R |
| 5,916,023 | A | * | 6/1999 | Meyer | D06F 58/14 34/235 |
| 6,131,958 | A | * | 10/2000 | Craig | F16L 37/248 285/136.1 |
| 6,443,834 | B1 | * | 9/2002 | Berger | F24F 13/06 454/353 |
| 6,682,415 | B1 | * | 1/2004 | Vagedes | F24F 7/00 454/339 |
| 6,780,100 | B1 | * | 8/2004 | Gretz | F24F 7/00 34/235 |
| 2002/0124495 | A1 | * | 9/2002 | Layne | E04F 17/04 52/302.1 |
| 2005/0005548 | A1 | * | 1/2005 | Charron | E04F 17/04 52/302.1 |
| 2005/0055920 | A1 | * | 3/2005 | Lajewski | F24F 13/084 52/302.1 |
| 2005/0081466 | A1 | * | 4/2005 | Dovell | F24F 7/013 52/302.1 |
| 2005/0166499 | A1 | * | 8/2005 | Andersen | E04F 17/04 52/302.1 |
| 2005/0202778 | A1 | * | 9/2005 | Stravitz | F24F 13/082 34/235 |
| 2007/0010190 | A1 | * | 1/2007 | Butler | F24F 13/084 454/171 |
| 2007/0010191 | A1 | * | 1/2007 | Vanden Bosch | F24F 7/00 454/359 |
| 2007/0257487 | A1 | * | 11/2007 | Jacklich | F16L 37/252 285/402 |
| 2008/0182504 | A1 | * | 7/2008 | Dijk | F24F 13/082 454/276 |
| 2012/0238200 | A1 | * | 9/2012 | Berkovitz | F24F 13/082 454/367 |
| 2016/0265699 | A1 | * | 9/2016 | Smith | F24F 13/0209 |
| 2018/0128406 | A1 | * | 5/2018 | Kozicz | F16L 37/252 |
| 2018/0216845 | A1 | * | 8/2018 | Whitehead | F24F 13/10 |
| 2020/0173684 | A1 | * | 6/2020 | Waldner | F24F 13/0227 |
| 2021/0285684 | A1 | * | 9/2021 | Beach | F16L 15/001 |

FOREIGN PATENT DOCUMENTS

| | | | | |
|---|---|---|---|---|
| EP | 0771399 B1 | * | 10/1999 | F16L 5/02 |
| GB | 2269664 A | * | 2/1994 | E04B 1/7076 |
| GB | 2274511 A | * | 7/1994 | F24F 13/12 |
| KR | 100244702 B1 | * | 3/2000 | F24F 13/0227 |
| WO | WO-2011148646 A1 | * | 12/2011 | F24F 7/04 |

* cited by examiner

CLOTHES DRYER EXHAUST VENT FOR BUILDING EXTERIOR WALL

CROSS-REFERENCE TO RELATED APPLICATIONS

This application is a Continuation-In-Part (CIP) patent application to pending patent application Ser. No. 17/177,655 filed Feb. 17, 2021.

BACKGROUND OF THE INVENTION

1. Field of the Invention

This invention relates generally to a clothes dryer exhaust vent, mounted within and through the exterior wall of a residential or commercial building, to allow the clothes dryer hot exhaust air to be transmitted from indoors through the vent to the outdoors.

Specifically, the invention provides for the installation of the clothes dryer exhaust vent, during the initial construction of a residential or commercial building, eliminating the costs of any after-building construction modifications, when installing a clothes dryer exhaust vent. Important features include 1) a clothes dryer exhaust vent tube, centrally fastened (and manually removable) through 2) a building foundation exterior wall, rigid, rectangular mounting plate, 3) an exterior (outdoor) vent tube end cover that includes a circular flapper exhaust valve, manually removable to clean the flapper valve, tube, and vent hose of lint, 4) an exterior grill at the outdoor end of the vent tube end cover for venting exhaust while preventing outdoor vermin from entering the outdoor exhaust vent tube opening, and a clothes dryer exhaust vent tube extension (for indoors) connected to the clothes dryer exhaust vent tube, for that connects to a clothes dryer flexible exhaust hose.

2. Description of Related Art

The use of a clothes dryer, especially in a basement or utility room of a residential building, is well known. It is very desirable to provide a hot air exhaust system for the removal of the hot moist air, generated by a clothes dryer during operation, to the outdoors of the residential building. Once a residence is built, especially on a concrete block foundation, it is often very expensive to add a clothes dryer exhaust vent passage into a solid exterior foundation wall. Such a wall passage addition requires drilling and construction modifications of the exterior foundation wall of the building in order to provide a sufficiently-sized passage for the hot exhaust air to pass from indoors to outdoors.

The clothes dryer exhaust vent disclosed herein, as the invention, greatly reduces the problems and the costs associated with constructing a clothes dryer exhaust vent through an existing exterior wall of a building. Instead of drilling through the side wall on a frame structure built on a conventional foundation, the invention is mounted in the exterior wall, when the building is constructed. With the invention disclosed herein, the clothes dryer exhaust vent is installed at the time the building is constructed, preferably in a building exterior wall, greatly reducing future problems and costs that could arise by putting a clothes dryer exhaust vent through an existing wall structure. The terms "Concrete Masonry Unit block, (CMU), cement block, concrete block, blocks, and keyed blocks" are used synonymously throughout the specification, when describing a building exterior wall during installation that can receive the wall mounting plate as part of the initial construction surrounded by CMU blocks.

Because the clothes dryer exhaust vent exterior wall, rigid rectangular mounting plate is permanently installed during the construction of the building, the functioning structure of the clothes dryer exhaust vent should be accessible for ease of removal, manually for cleaning, while protecting the building interior from any exterior harmful elements including insects, vermin, and weather elements. The clothes dryer central exhaust vent tube is manually removable from the wall mounting plate, if necessary, after installation. The exterior (outdoors) end clothes dryer exhaust vent tube end vent cover assembly, with an exhaust flapper valve attached, can be manually removed for cleaning of lint from the vent tube and flapper valve surfaces . The interior inlet opening end (indoors) of the exhaust vent tube has a tubular diameter that allows the exhaust vent tube end to be connected to clothes dryer flexible exhaust hoses of different diameters with a clamp.

SUMMARY OF THE INVENTION

A clothes dryer exhaust vent that is installed in a building foundation exterior wall, while the building is being constructed, in some embodiments. The clothes dryer exhaust vent installation during building construction alleviates a future requirement to create an access passage through an existing building foundation exterior wall, that could be an expensive and a possibly cause exterior wall destructive action, if done after construction.

Broadly, in a preferred embodiment of the invention, the clothes dryer exhaust vent is comprised of 1) a building foundation exterior, rigid, rectangular, wall mounting plate, having a circular central aperture, and a 2) a clothes dryer exhaust vent tube that is manually fastened (and removable) to and through the wall mounting plate central aperture.

The clothes dryer exhaust vent includes 3) a clothes dryer exhaust vent tube first end cover assembly (for outdoors) that includes a dryer exhaust circular flapper valve. The outdoor clothes dryer exhaust vent first end cover assembly (and flapper valve) manually attaches (but is removable) to the clothes dryer exhaust vent tube first end that has peripheral, radially extending, male fasteners (three). The (outdoor) vent cover assembly with the flapper valve, when attached, fits flush against the outdoor side of the building exterior, rigid, rectangular, wall mounting plate. 4) The clothes dryer exhaust vent tube first end cover assembly has a circular frame, a solid top cover surface that is hemispherical in shape and that is connected above a hemi spherically-shaped bottom grill to the circular frame. The clothes dryer exhaust vent first end cover assembly has attached thereto a flat circular flapper valve that pivots and covers the first end of the clothes dryer exhaust vent tube in a first closed position (by gravity) and a maintains a second open position, under clothes dryer exhaust vent air pressure, for expelling the clothes dryer exhaust air outdoors. The circular clothes dryer exhaust vent end cover assembly rim also includes a plurality of female fasteners for firm attachment with the wall mounted plate male fasteners projecting perpendicularly outward around the wall mounting plate exterior circular aperture, by manual rotation.

5) A clothes dryer exhaust vent extension tube (for use indoors) is fastened to the second open end of the clothes dryer exhaust vent tube mounted through the circular center aperture and fastened to the rigid wall mounting plate. The clothes dryer exhaust vent extension tube is slightly tapered in diameter from its first fastened end to its second end that opens indoors. A clothes dryer flexible exhaust hose, which may have different-sized diameters, can be firmly attached to the (indoor) open second end of the interior clothes dryer exhaust vent extension tube, that permits a clothes dryer flexible exhaust hose,, of varying diameters, to be clamped to the extension vent tube indoor second open end.

The clothes dryer exhaust vent rigid, rectangular, wall mounting plate includes a rigid, rectangular plate, sized in length and width, in some embodiments, to be equivalent to a common masonry unit (CMU). The rigid, rectangular, wall mounting plate has a circular aperture, typically at its center, the circular aperture including three spaced-apart radially extending arc fasteners that receives and connects, manually, firmly to Z shaped fasteners on the exterior surface of the clothes dryer exhaust vent tube, by manual rotation, of the clothes dryer exhaust vent tube positioned in the wall mounting plate circular aperture, to lock the rigid wall mounting plate to the clothes dryer exhaust vent tube by Z-shaped fasteners to a plurality of the wall mounting plate circular aperture, spaced-apart, radially extending arcs.

. The rigid rectangular wall mounting plate has parallel, flat, left and right vertical sides, with each vertical side sized in thickness that the rigid plate vertical side edges can fit snugly into keyed, or eared, concrete block slots during installation of the clothes dryer exhaust vent into the building exterior foundation wall, during construction.

The rigid, rectangular, wall mounting plate has an exterior surface that faces outdoors, outwardly, on the exterior side of a building foundation wall and an indoor, interior surface that faces the interior of a building, when installed. The rigid, rectangular, wall mounting plate can face either direction, inside or outside when installed.

In the preferred embodiment, the clothes dryer exhaust vent rigid, rectangular, wall mounting plate has a vent exhaust tube disposed through its circular center aperture, said rigid, wall mounting plate surface on one side, surrounding the rigid plate center aperture, including two or more vertical raised radially pointing male peg fasteners for firmly attaching the outdoor exhaust vent cover (and flapper valve) assembly female fasteners to the outdoor side of the wall mounting plate.

The clothes dryer exhaust vent exhaust tube extends through the rigid wall mounting plate circular aperture and extends indoors, inside a building, outwardly from the interior (indoor) side of the rigid, rectangular wall mounting plate.

The clothes dryer exhaust vent tube (outdoor facing) outer peripheral curved surface includes three peripherally spaced, perpendicular and radial, raised circumferential, manually-actuated Z shaped brackets fasteners, each with a single movable tab, for firmly attaching the clothes dryer exhaust vent tube (by rotation) to three raised, radially-flat, peripheral arc flanges, spaced apart, each arc flange having a tab engagement hole for a single tab, the flat arc flanges radially, on the inside rim of the rigid, wall mounting plate circular aperture. Each vent tube exterior Z-shaped bracket has one end portion abutting one side of an arc flange and the opposite end portion abutting the opposite side adjacent arc flange, locking the Z-shaped fastener tab on the wall mounting plate arc flange spaced-hole. It is important that the clothes dryer exhaust vent tube be firmly attached to the rigid, rectangular, wall mounting plate, at all times.

A hemispherical-shaped clothes dryer exhaust vent tube first end cover assembly, {having a circular disk-shaped, pivotally attached, vent flapper valve) is (removably) fastened, by its circular frame and its female fasteners, to male radial fasteners on the exterior first end opening of the clothes dryer exhaust vent tube. A lower portion of the vent cover assembly has a hemispherical—shaped cage-like open frame structure with openings to allow the clothes dryer exhaust vent air to exit outdoors, while the top portion is protectively covered with a solid hemispherical-shaped surface member.

The preferred embodiment has a clothes dryer exhaust vent extension tube that is permanently attached at one end to the second open end of the clothes dryer exhaust vent tube extending through the wall mounting plate (in the interior portion of the building). The vent extension tube has at one open end crush ribs around its end opening so that the vent extension tube end can be firmly fastened to the clothes dryer exhaust vent tube (interior facing) second open end, extending the clothes dryer exhaust vent tube away from the rigid, wall mounting plate on the interior side (indoors). The vent extension tube body has a segment in a somewhat slight conical shape, wherein the vent extension tube body diameter is longitudinally changing so that the vent extension tube can receive clothes dryer flexible exhaust hoses of different diameters that can be fastened to the clothes dryer vent extension tube outlet end with a clamp.

In the preferred embodiment, a circular disk-shaped flapper valve is pivotally attached to the vent cover assembly circular frame interior, allowing a flapper valve to cover the open first end of the clothes dryer exhaust vent tube by gravity, when a clothes dryer is not in operation, allowing the flapper valve to open freely by the clothes dryer exhaust air pressure through the clothes dryer exhaust vent blowing clothes dryer exhaust air outdoors through the vent cover.

The exhaust vent first end cover includes a ribbed, cage-like structure over the bottom half, in a hemispherical shape, that allows the clothes dryer exhaust air to be vented outdoors, while protecting the vent itself from receiving vermin from getting into the clothes dryer exhaust vent system, which is also protected by the flapper valve when the system is not in operation.

In the preferred embodiment, the rigid, rectangular, wall mounting plate can be constructed of molded plastic or metal. The remaining components of the invention, including the clothes dryer exhaust vent tube attached through the rigid, rectangular, wall mounting plate (surrounding the wall mounting plate circular aperture) and the vent extension tube are typically made of plastic. The outdoor clothes dryer exhaust vent first end cover circular assembly (and attached circular flapper valve) are also made of plastic, although other materials of metal or fiberglass are feasible.

Once the foundation clothes dryer exhaust vent is constructed, the device is installed at a selected location in a building exterior foundation wall during the construction of a building. In a building foundation wall being made of concrete blocks, the proper location of the clothes dryer exhaust vent is selected, and when that location is being constructed of cement blocks, the rigid, wall mounting plate forming the clothes dryer exhaust vent will be inserted between two horizontal keyed blocks or regular CMU, each block having a vertical receiving slot for attaching one end edge of the rigid, wall mounting plate thereto. The remaining foundation wall will be constructed around the blocks and the rigid, wall mounting plate for the dryer vent.

The length and width of the rigid, rectangular, wall mounting plate can be varied, depending on different types of building foundations that may require different size wall mounting plates for integration with the block housing or construction of the foundation wall. In some areas it may be desirable to have a half-block sized rigid rectangular plate which would still accommodate a clothes dryer exhaust vent that may be 8 inches in length instead of 16 inches in length, when installed in the block foundation.

It is an object of this invention to reduce the cost and alleviate grinding and drilling through a building foundation wall in order to install a clothes dryer exhaust vent from a building interior to vent clothes dryer exhaust air to a building exterior, outdoors on the exterior of a building, by installing a clothes dryer exhaust vent during the initial construction of the building foundation exterior wall. In some embodiments, the foundation wall clothes dryer exhaust vent is designed to be mounted in the top course of a block wall construction. The rigid, rectangular wall mounting plate, in some embodiments, has a top flat edge perpendicular to the two vertical side edges, said wall mounting plate top flat edge including a flat flange overlapping a wall mounting plate building exterior face and a wall mounting plate building interior face, said flat flange for supporting a CMU building foundation block.

In an alternate embodiment, the invention can use a rigid, rectangular, wall mounting plate for securing a clothes dryer exhaust vent tube and accessary components, to an existing residential or commercial building, having an exterior wall made of wood and non-concrete materials. The clothes dryer exhaust vent wall mounting plate alternate embodiment has a square (or rectangular shape) that includes a flat perimeter frame with a plurality of elongated slots, spaced apart, to receive nails or screws for attaching the wall mounting plate or block to a wooden exterior building surface. A central flat wall mounting plate or block panel is integrally formed with peripheral frame and has a circular clothes dryer exhaust vent tube aperture and circular aperture radial arcs, three, spaced equally apart, to attach a clothes dryer exhaust vent tube through the wall mounting block center aperture, as already described above for the rigid, wall mounting plate. The wall mounting block can be constructed of wood, plastic, or metal. The clothes dryer exhaust vent air tube exhaust vent components can be the same structure as in either the preferred embodiment used with concrete construction mounting plate or the alternative embodiment use with a wooden, plastic or metal wall mounting block to building exterior walls of wooden construction, during building construction or on existing wooden buildings.

BRIEF DESCRIPTION OF THE DIFFERENT VIEWS OF THE DRAWINGS

DETAILED DESCRIPTION OF THE INVENTION

Figure 1A:
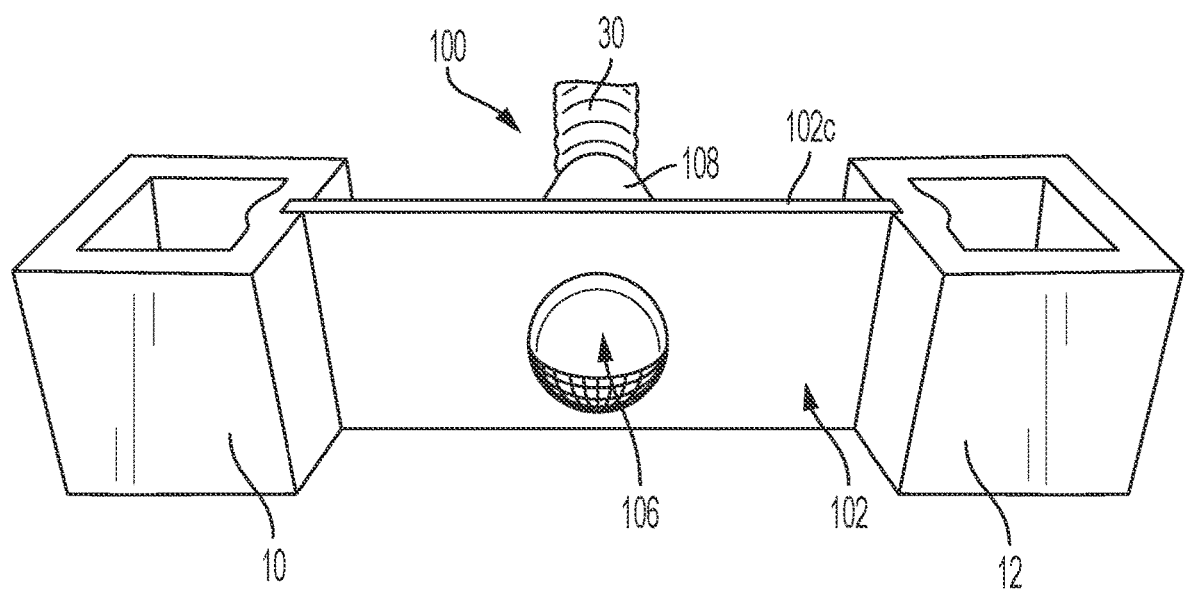
FIG. 1A is an exterior front perspective view of the invention, shown mounted between two building foundation blocks.
Figure 1B:
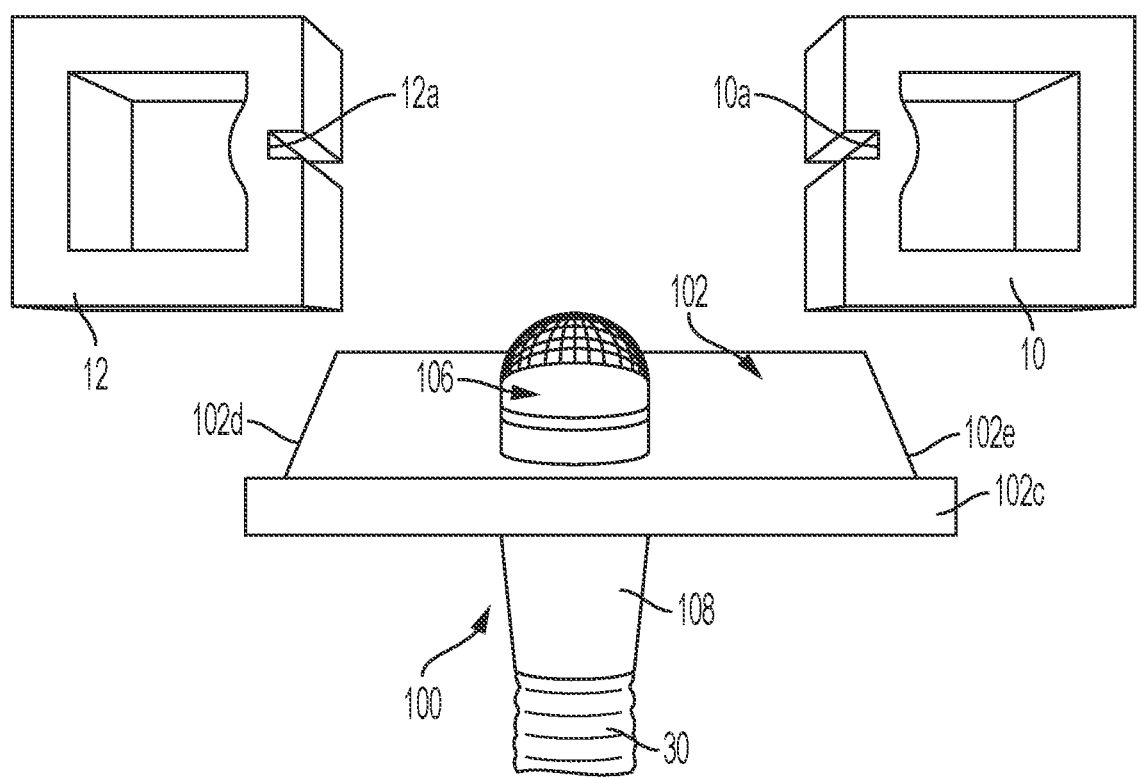
FIG. 1B is a top plan view partially in perspective of the invention shown in FIG. 1A, positioned adjacent to foundation blocks prior to insertion.

Referring now to the drawings, and in particular FIG. 1A and FIG. 1B, the invention 100 is shown mounted between a pair of concrete blocks 10 and 12. FIG. 1A and FIG. 1B illustrate how the invention 100 comprising a clothes dryer exhaust vent is installed during construction of a building foundation between a pair of blocks 10 and 12. The rectangular length and width of the rigid, wall mounting plate 102 is sized so that the rigid, wall mounting plate 102 is an appropriate concrete block size and that the rigid, wall mounting plate 102 fits tightly and permanently from side to side, and above and below, building foundation wall blocks. As shown in FIG. 1A, the view is as seen from the exterior of the building. For this exterior view in FIG. 1A, a vent cover assembly 106 is flush with wall mounting plate 102. A vent tube extension 108 is attached to the clothes dryer exhaust vent tube (not shown) through wall mounting plate 102 and to a clothes dryer flexible exhaust hose 30 on the building interior side of wall mounting plate 102.

FIG. 1B shows a top view of the representation of the invention 100 in FIG. 1A illustrating the slots 10a and 12a in block 10 and block 12 that receive the side vertical edges 102e and 102d respectively, of the rigid, wall mounting plate 102. Invention 100, as shown, includes the rigid, wall mounting plate 102 having the vent cover assembly 106 facing outwardly flush on the exterior of wall mounting plate 102. The vent extension tube 108, connected to the clothes dryer exhaust vent tube (not shown in FIG. 1B), is also connected to clothes dryer flexible exhaust hose 30. The illustration of FIG. 1B is to show, from a top view, how the clothes dryer exhaust vent invention 100 can be positioned downwardly between two keyed blocks 10 and 12 having vertical slots 10a and 12a, during the construction of the building, to permanently mount the clothes dryer exhaust vent 100 into a building foundation wall, using wall mounting plate 102.

Figure 2:
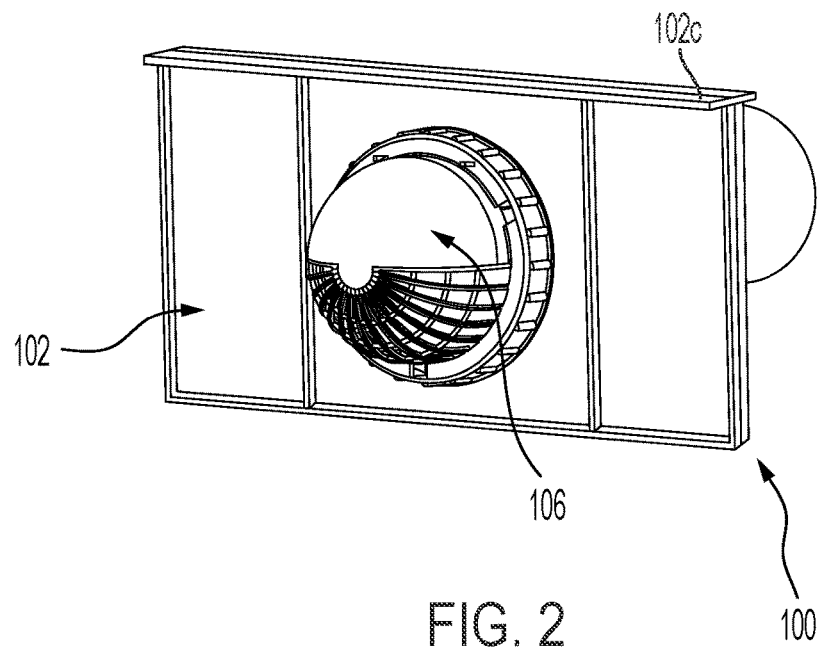
FIG. 2 is a front perspective view of the invention.
Figure 3:
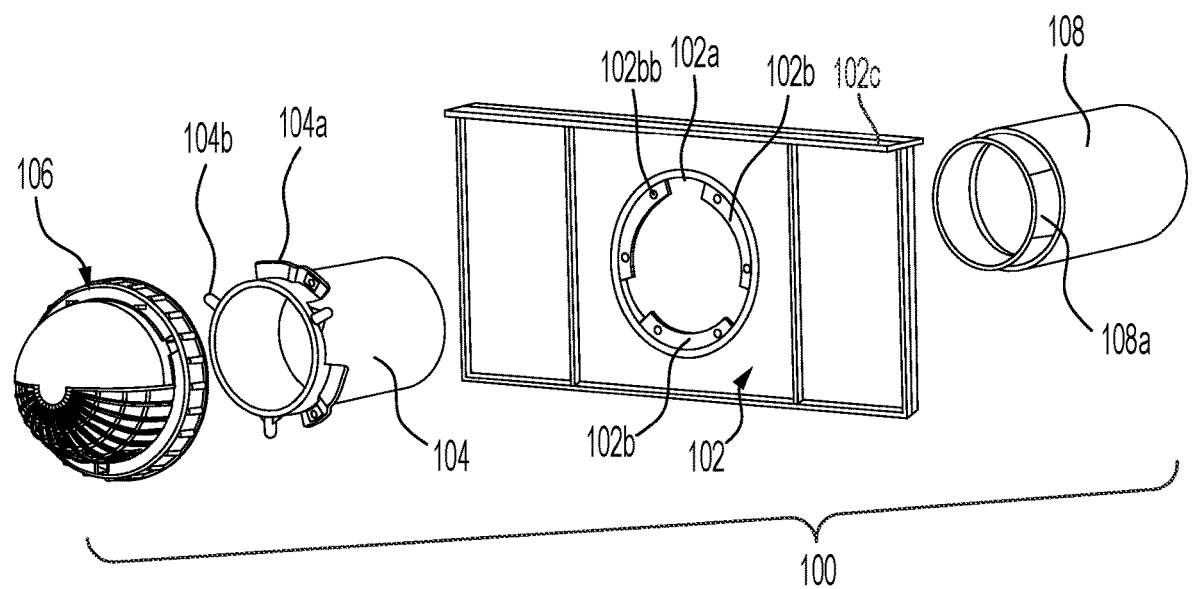
FIG. 3 is a front perspective, exploded view of the invention.

Referring now to FIGS. 2 and 3, the preferred embodiment disclosing the best mode contemplated by the inventor of the invention 100 is shown. FIG. 2 shows a perspective front view of a clothes dryer exhaust vent 100 as the clothes dryer exhaust vent would appear from the exterior of a building, and is comprised of a rigid, wall mounting plate 102, the exhaust vent tube 104 (not shown in FIG. 2), and the vent cover assembly 106, that includes a flapper valve (not shown), firmly attached to the rigid, wall mounting plate 102.

FIG. 3 shows the preferred embodiment in an exploded view of the invention 100, shown in FIG. 2. In FIG. 3, wall mounting plate 102 would be mounted during initial construction of a residential or commercial building, side by side, between two construction blocks as described above. A clothes dryer exhaust vent tube 104 is positioned through the circular aperture having an inner peripheral surface 102a in wall mounting plate 102 and is fastened (manually by rotation) to rigid, rectangular, wall mounting plate 102 between projecting inner peripheral surface 102a radial arc flanges 102b that attach to clothes dryer exhaust vent tube 104 radial Z-shaped peripheral fastener 104a, that engages between, by manual rotation, two spaced-apart peripheral arc flanges 102b.

A hemispherical-shaped vent cover assembly 106 (which contains a circular flapper valve, not shown in FIG. 3) is also connected (manually by rotation) to one end of clothes dryer exhaust vent 104, as shown in FIG. 2, by male radially extending fasteners 104b to female fasteners 106f located in the vent cover assembly rim 106a. (See FIG. 5.)

The clothes dryer exhaust vent tube 104 extends completely through wall mounting plate 102 and circular aperture 102a. The building interior (indoors) second end of exhaust vent tube 104 is fastened to vent extension tube end 108a. The vent extension tube 108 ultimately is connected to a clothes dryer exhaust flexible hose, not shown in FIG. 3. FIG. 3 shows the clothes dryer exhaust vent 100 that is typically in place between a pair of horizontal blocks (CMU) in a residential or commercial building concrete block wall.

Figure 4:
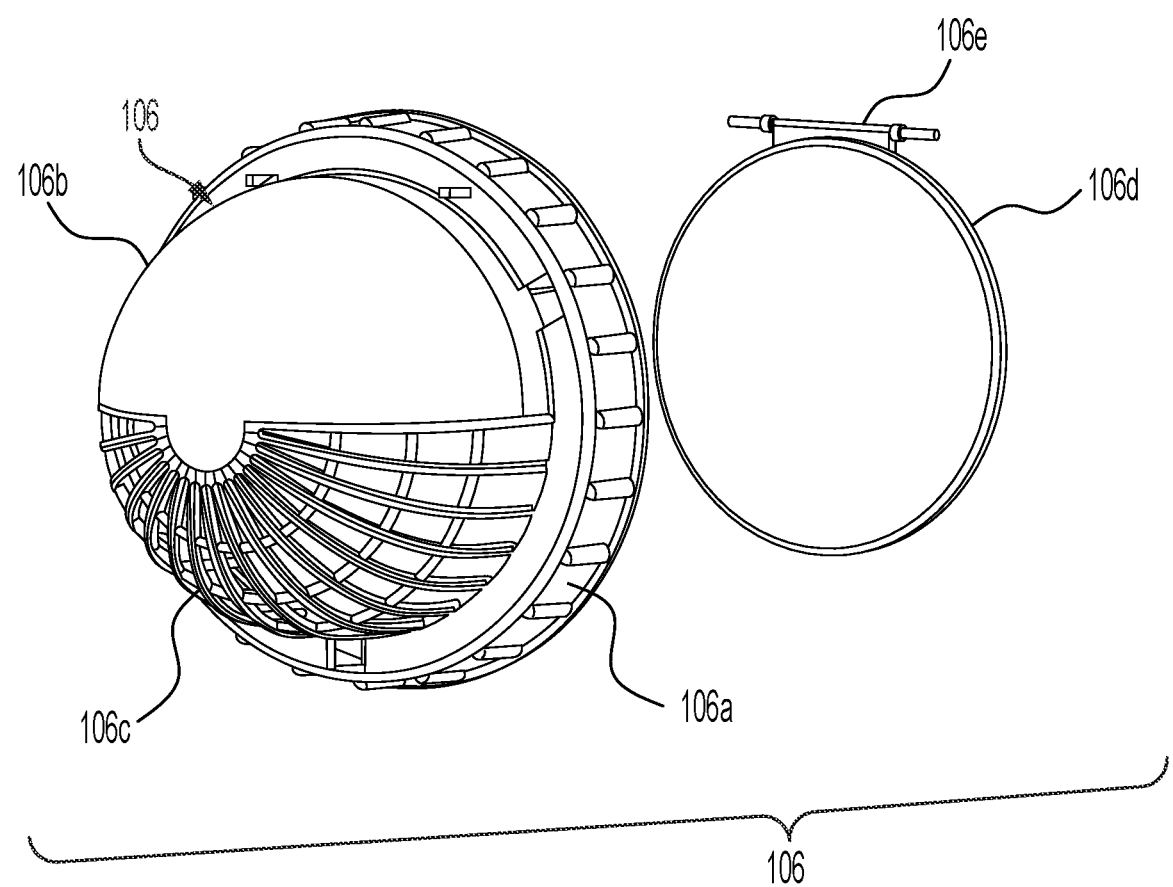
FIG. 4 is a front exploded view of the exterior (outdoor) vent cover assembly and flapper valve.
Figure 5:
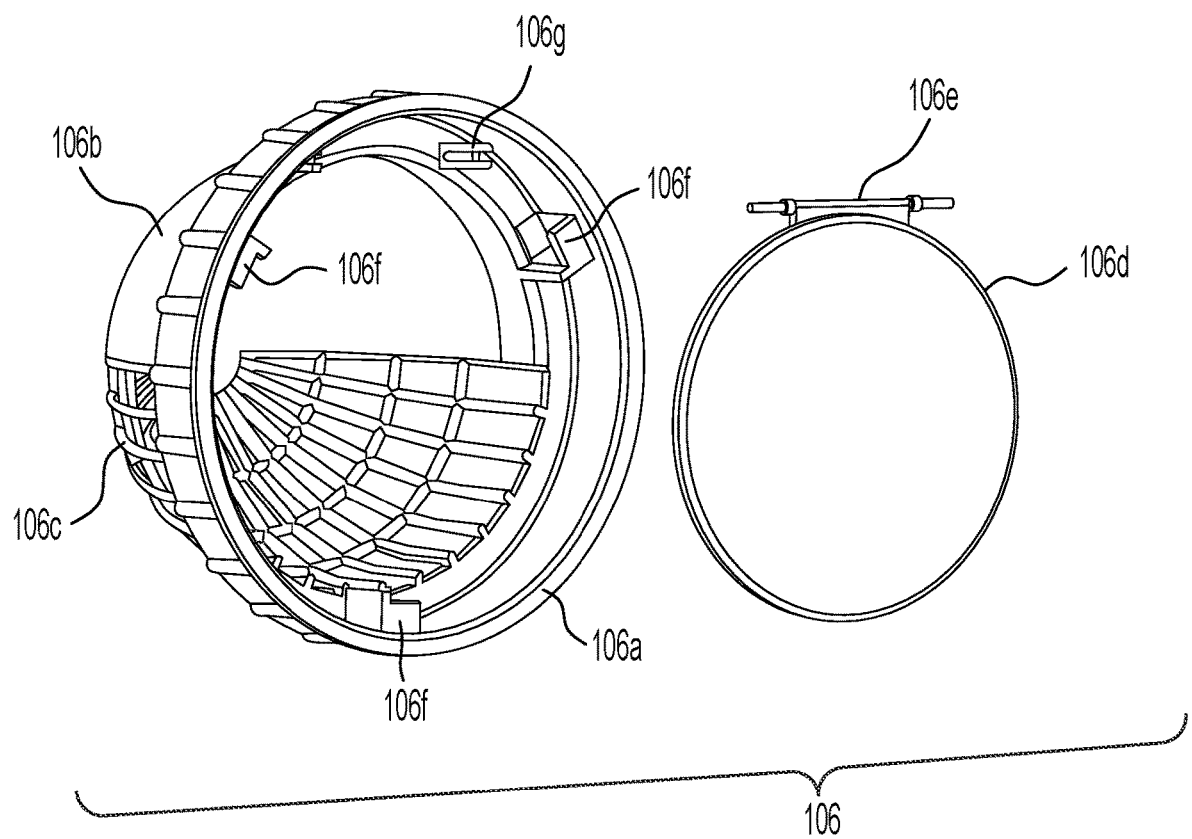
FIG. 5 is a rear perspective, exploded view of the vent cover assembly and flapper valve.

In the preferred embodiment, FIG. 4 and FIG. 5 show an exploded view of the vent cover assembly 106, which also includes an interior set of flapper valve fasteners 106g that can connect to the circular flapper valve 106d that includes a fastening rod 106e so that the flapper valve 106d can pivot outwardly from fasteners spindle rod 106e due to the exhaust air pressure of clothes dryer exhaust coming through the clothes dryer exhaust tube 104, when the clothes dryer (not shown), is in operation. The hemispherical-shaped vent cover assembly 106 has a circular rim housing 106a that includes three inside female slot fasteners 106f that manually attach to radial male fasteners 104b (FIG. 3), at the exterior (outdoors) end of clothes dryer exhaust vent tube 104. The clothes dryer exhaust vent tube 104 is mounted through and attached firmly to the wall mounting plate 102. The vent cover assembly 106, including hemispherical-shaped upper cover 106b and flapper valve 106d, can be removed manually by rotation, whenever necessary, to clean any debris or lint that may accumulate in exhaust vent tube 104 first end or the lower rib cage-like structure 106c portion of the vent cover 106.

Figure 6:
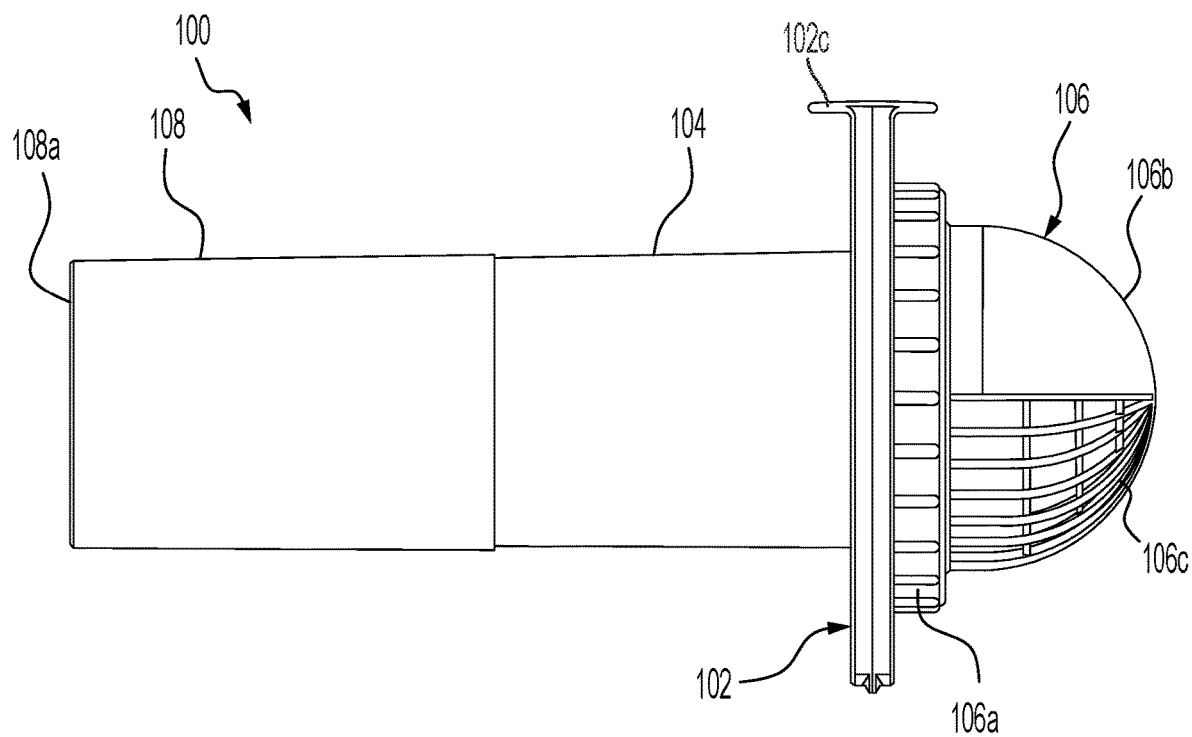
FIG. 6 shows side elevational view of the invention.
Figure 7:
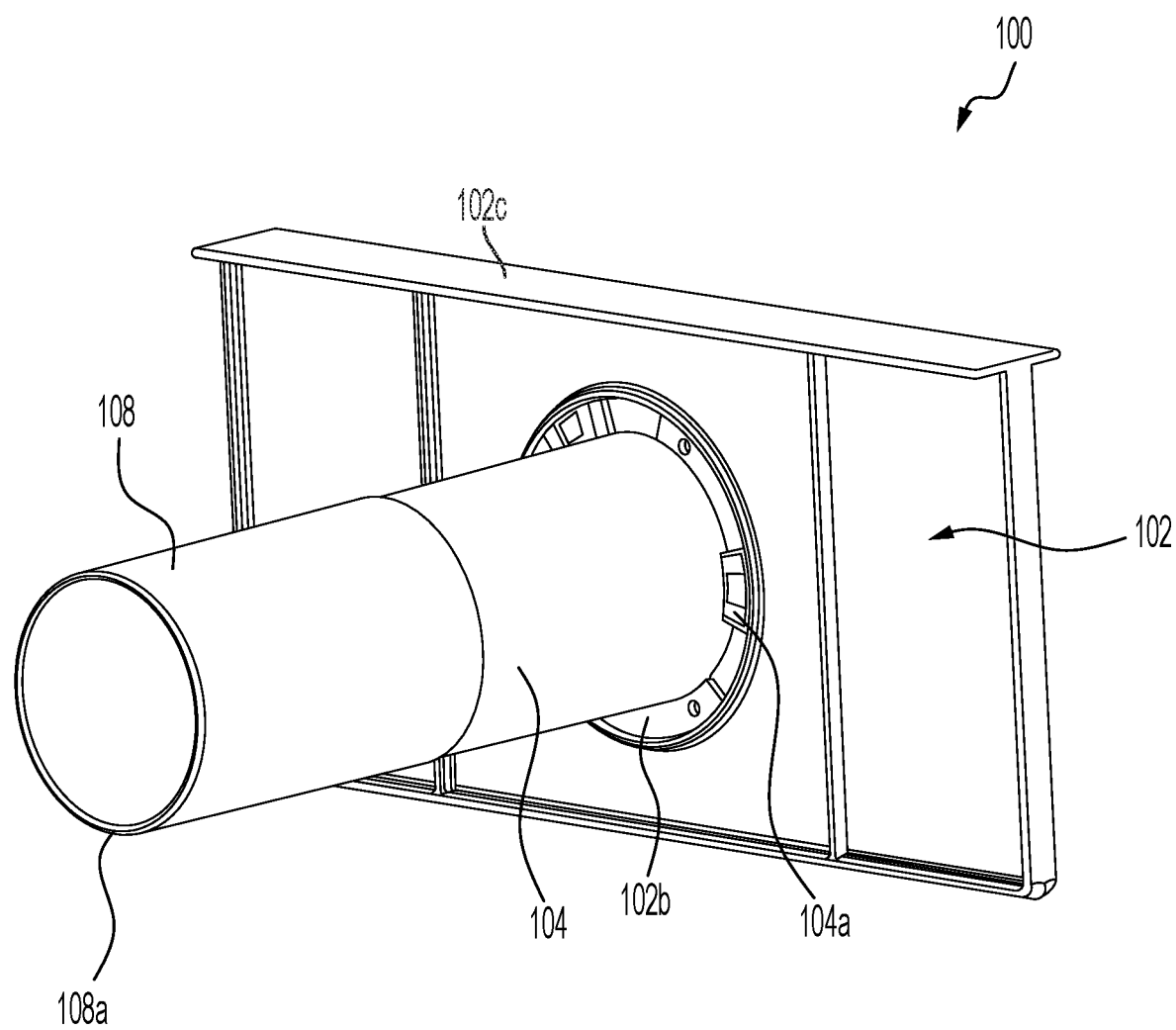
FIG. 7 shows a rear perspective view, of the invention.

FIG. 6 and FIG. 7 show side views of the clothes dryer exhaust vent 100. Exhaust vent cover assembly 106, with the upper hemispherical-shaped solid cover 106b and lower rib cage 106c, are molded as one piece with vent cover assembly rim 106a and attach manually by rotation to the rigid, rectangular, wall mounting plate 102 with male and female fasteners. The clothes dryer exhaust vent tube 104 extends through rigid, rectangular, wall mounting plate 102 and is firmly attached to vent extension tube 108 that has a slightly tapered, longitudinally axially, conical tubular peripheral surface. The diameter of vent extension tube open end 108a is smaller than its opposite attached end, to accommodate the open end 108a attached to a clothes dryer exhaust flexible hose (not shown) of different diameters that can attach over the vent extension tube open end 108a with a conventional clamp.

FIGS. 2, 3, 6 and 7 show the rigid, rectangular wall mounting plate 102 having a top flat edge, perpendicular to the wall mounting plate 102 vertical parallel side edges, said wall mounting plate top flat edge including a flat flange 102c overlapping the wall mounting plate building exterior and interior faces. The flat flange 102c is used for supporting a CMU building foundation block when the wall mounting plate has been installed in a building exterior wall providing a clothes dryer exhaust vent.

Figure 8:
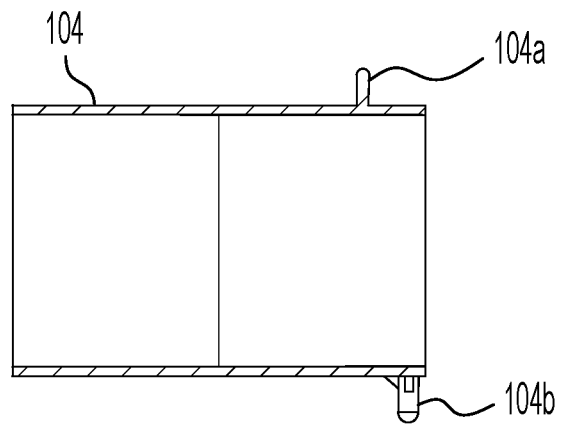
FIG. 8 shows a side elevational view in cross-section of clothes dryer exhaust vent tube that attaches to the rigid, rectangular, wall mounting plate.
Figure 9:
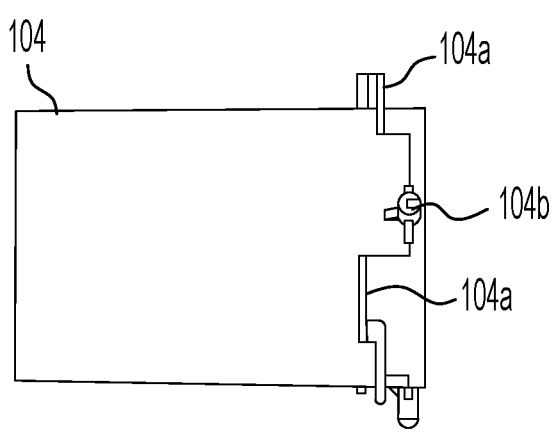
FIG. 9 shows a side elevational view of the clothes dryer exhaust vent tube that attaches to the rigid, rectangular, wall mounting plate.
Figure 10A:
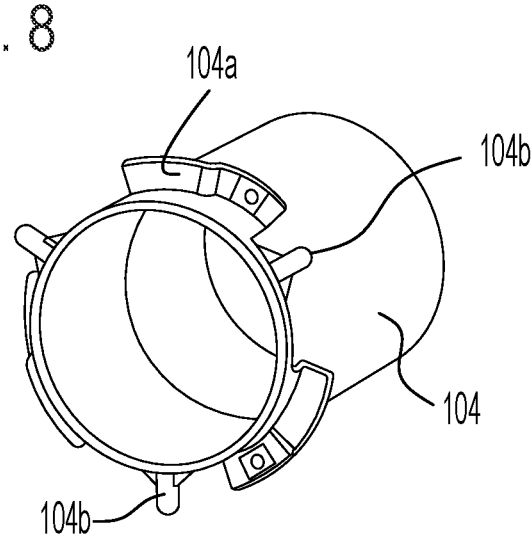
FIG. 10A shows a front perspective view of the exhaust vent tube that attaches to the rigid rectangular wall mounting plate.
Figure 10B:
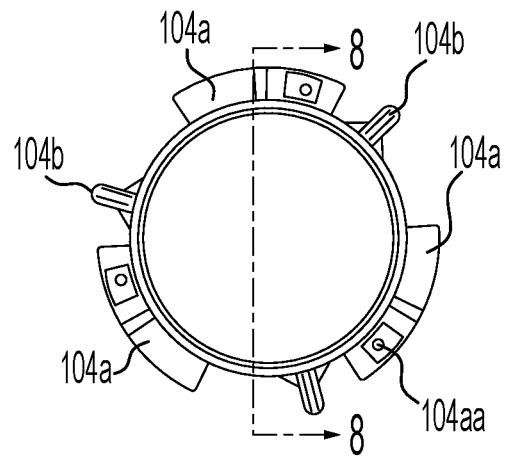
FIG. 10B shows a front elevational of the clothes dryer exhaust vent tube that attaches to the rigid, rectangular, wall mounting plate.

FIG. 8 shows a side elevational view in cross-section of clothes dryer exhaust vent tube 104 and a Z-shaped fastener 104a that is used to attach the clothes dryer exhaust vent tube 104 firmly to a rigid, rectangular, wall mounting plate 102 (FIG. 3) and radial male fastener 104b that is used to connect the hemispherical-shaped exhaust vent end cover assembly 106 to the exterior open first end of clothes dryer exhaust vent tube 104 (FIG. 3). FIG. 9 shows a side elevational view with the Z-shaped fasteners 104a and radial male fastener 104b. FIG. 10A and FIG. 10B show the three Z-shaped fasteners and the three radial male fasteners 104b peripherally disposed and spaced equally apart around the exterior surface, near one end, of the clothes dryer exhaust vent tube 104. Each Z-shaped fastener 104a includes a movable engaging tab 104aa that when fastened to an internal peripheral arc 102b, each having a small hole 102bb for receiving peripheral arc tab 104aa when the exhaust vent tube 104 is mounted in the central aperture 102a of the rigid, rectangular, wall mounting plate 102. See FIG. 16.

Figure 11:
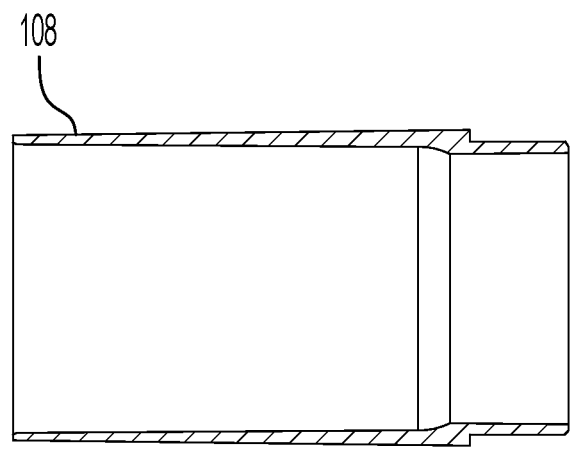
FIG. 11 shows a side elevational view in cross section of the clothes dryer exhaust vent extension tube.
Figure 12:
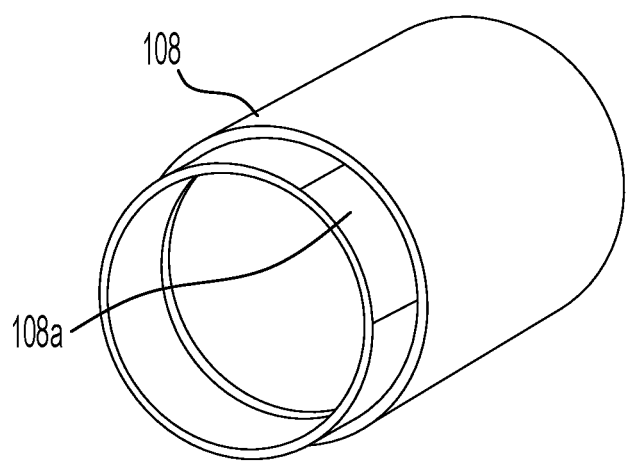
FIG. 12 shows front perspective view of the clothes dryer exhaust vent extension tube.
Figure 13:
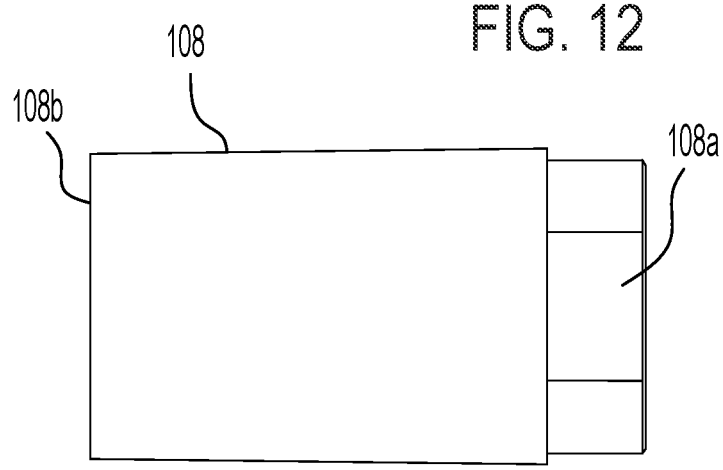
FIG. 13 shows a side elevational view of the clothes dryer exhaust vent extension tube.

FIG. 11, FIG. 12, and FIG. 13 show the exhaust extension vent tube 108 having a grooved (crush ribs) open end portion 108a that firmly attaches to the clothes dryer exhaust vent tube 104, as shown in FIG. 3. The exhaust vent extension tube 108 has an open end portion 108b with a smaller diameter than the end next to the rush ribs 108a end that attaches to the clothes dryer exhaust vent tube 104. Exhaust vent extension tube 108 open end 108b being slightly conically tapered can be connected to clothes dryer flexible exhaust hoses of different diameters by a conventional clamp (not shown). Panel portions of the exhaust vent extension tube 108a are grooved (crush ribs) to become more flexible when mechanically attaching to the exhaust vent tube of 104 open second end for a better fit.

Figure 14A:
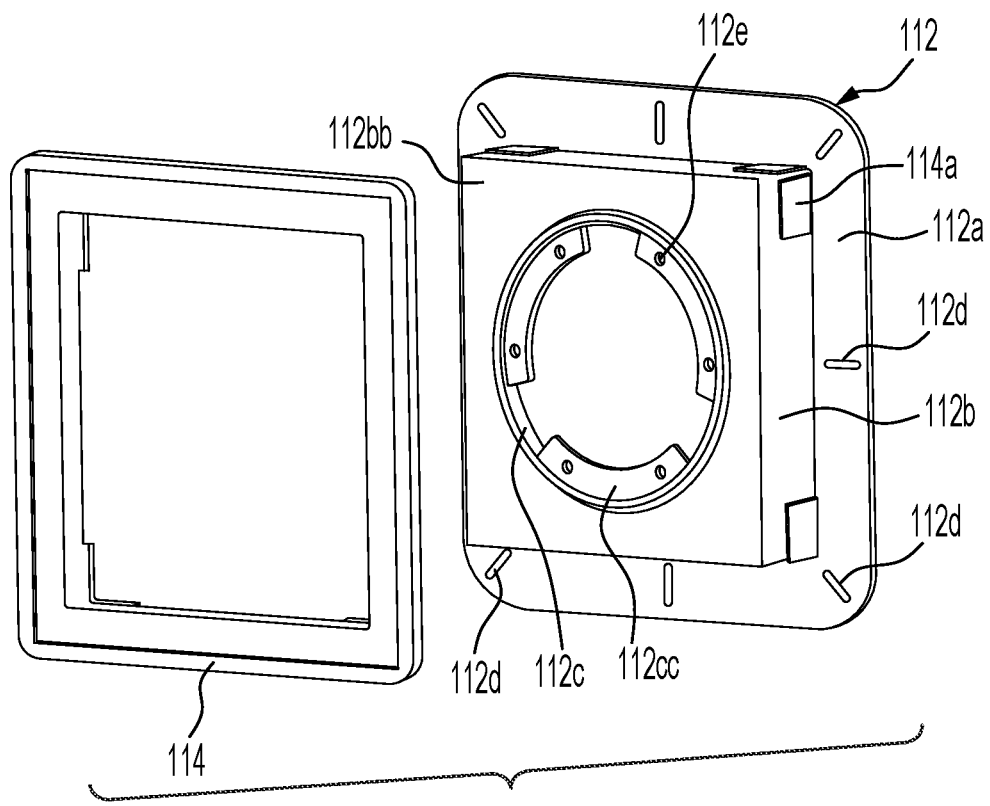
FIG. 14A shows an exploded view of an alternate embodiment of the invention of an exterior building wall mounting block and trim ring for a clothes dryer exhaust vent tubular assembly for permanent attachment to an existing residential or commercial building wooden exterior wall.
Figure 14B:
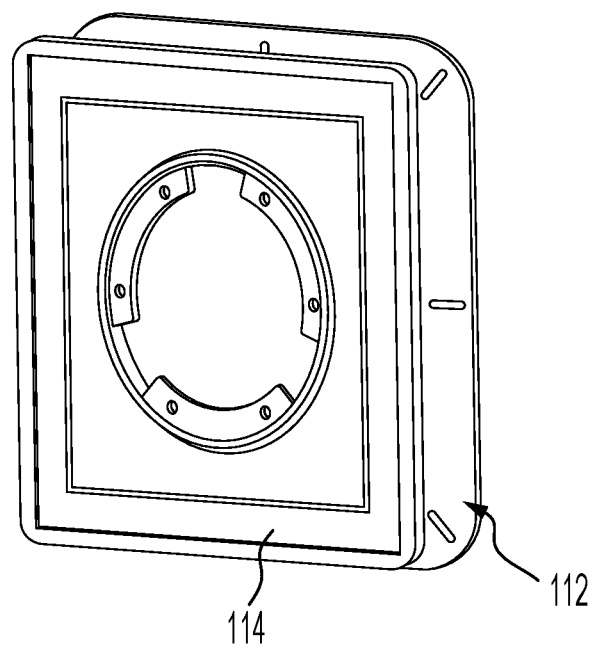
FIG. 14B shows a front perspective view of the alternate embodiment wall mounting block shown in FIG. 14A.

FIG. 14A and FIG. 14B show an exploded and front perspective view of an alternate embodiment of the invention comprising a rigid, square (or rectangular) wall mounting block 112 and a square (or rectangular) trim ring 114 that attaches securely to the wall mount block 112 (FIG. 14B) during installation on a building exterior wall. The wall mounting block 112 includes a peripheral flat, rectangular frame square 112a that includes a plurality of elongated slots 112d, each of the slots 112d for receiving a nail or screw when the wall mounting block 112 is permanently mounted to the exterior wall of a wooden building. The wall mounting block 112 also includes an interior raised square box 112b integrally formed with the frame 112a, to accommodate for the thickness of wooden exterior wall siding. The wall mounting block 112 interior the raised box 112*b,* has an interior wall 112*bb* (parallel to frame 112*a*) that includes a central aperture 112*c* that is sized in diameter to receive a clothes dryer vent exhaust tube, that is engaged to and mounted through wall mounting block aperture 112*c.* The dryer exhaust vent tube (not shown FIG. 14A and FIG. 14B) would be secured by block 112 Z-shaped fasteners (previously described above in the preferred embodiment) that attach through the spaces between the wall mounting block 112*cc* radially extending arches 112*cc* and are holes 112*e* for firmly securing a dryer exhaust vent tube to the wall mounting block 112, after the wall mounting block 112 has been securely fastened and screwed or nailed to the exterior wooden wall of an existing residential or commercial building. The trim ring 114 shown in FIG. 14A is securely fastened to the wall mounting block 112 raised box wall portion 112*b,* as shown in FIG. 14B. A friction fastener 114*a* at the corners of the wall mounting block raised box 112*b* hold the trim ring 114 in place against the wall mounting block frame 112*a.* the wall mounting block 112 and the trim ring 114 can be constructed of plastic, wood or metal. A space can be provided between the wall mounting block 112 peripheral frame 112*a* and the trim ring 114 to accommodate for the exterior siding on a wooden building and its thickness already constructed, and which has a wooden siding.

In another embodiment, the invention could be used for CMU or exterior building wall construction to provide a vent for bathroom fan exhausts and use a tube adapter (not shown) on the interior extension vent tube end. The invention is installed during building foundation construction. This embodiment of the invention can be constructed without the removable structure of the flapper valve housing, since cleaning of a flapper valve for bathroom exhaust fans would not be a problem. This embodiment can be an eight inch plate with a single port and a sixteen inch plate with a single or dual ports for CMU construction.

Figure 15:
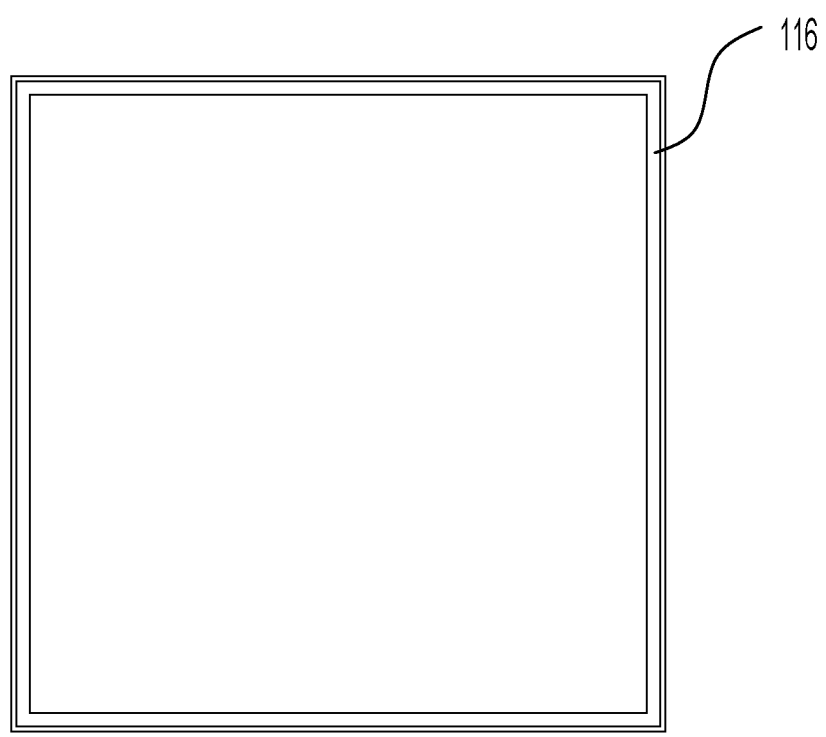
FIG. 15 shows a front elevational view of a square, rigid, wall mounting plate with no aperture.

In another embodiment of the invention, FIG. 15, a rigid, square wall mounting plate 116 remains a solid plate, without any openings. The frame dimensions .remain the same, offered in 8 inches and 16 inches. The solid plate thicknesses could vary from one-eight inch to three-quarters of an inch. The purpose of the invention, as initially installed in a foundation or exterior building wall in CMU construction, allows for quick and easy drilling though vinyl-plastics as opposed to chipping or drilling though a CMU wall. This provides for venting a multitude of items, relatively inexpensively, including air exchange pipes of oil/gas heaters, venting tank-less water heaters, and kitchen exhaust fans/hoods, after a building has been constructed.

Figure 16:
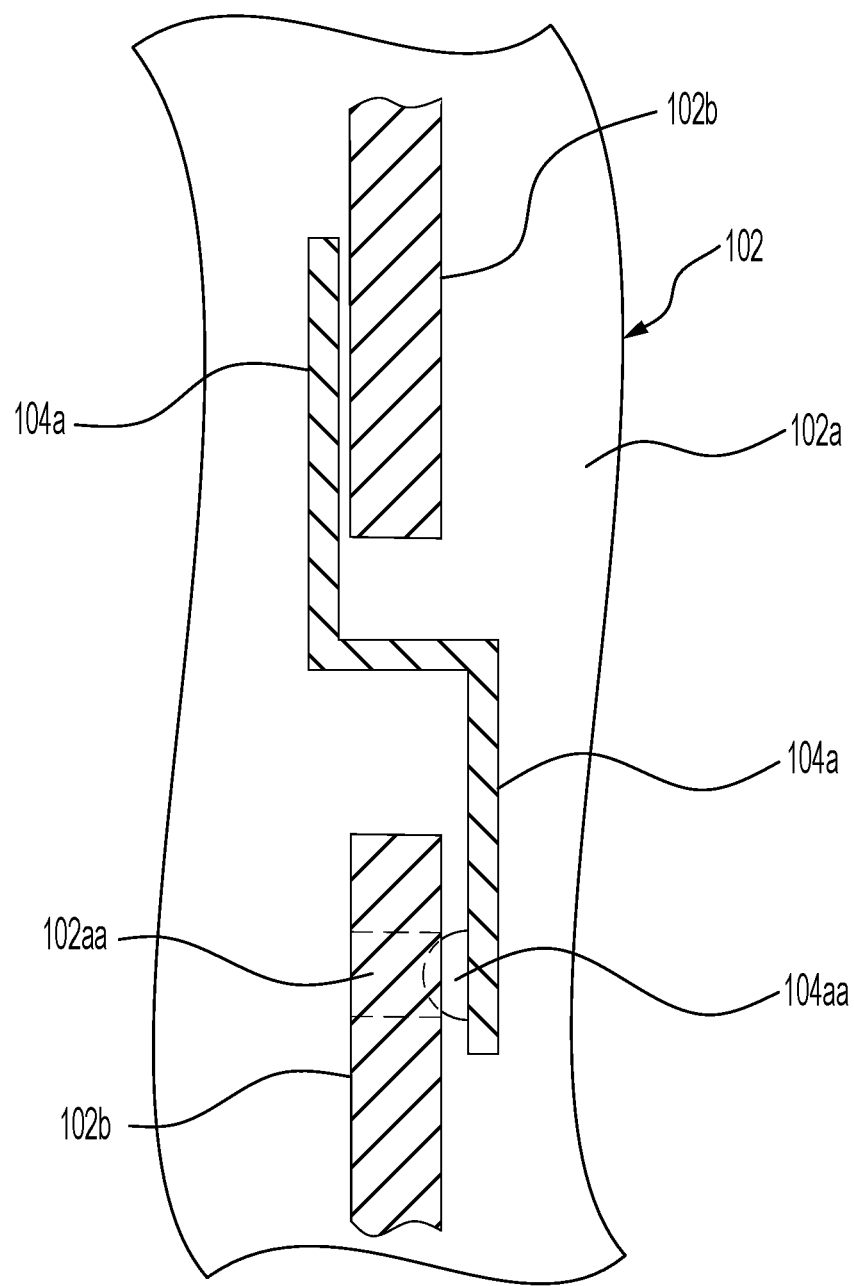
FIG. 16 shows a schematic cutaway drawing of a Z-shaped fastener on the periphery of the exhaust vent tube engaged with two spaced-apart peripheral arcs flanges disposed in the rigid rectangular, wall mounting plate circular aperture segment that provides firm connection of a clothes dryer exhaust vent tube and a rigid, rectangular, wall mounting plate.

FIG. 16 shows a schematic diagram of a Z-shaped fastener 104*a* and hemispherical-shaped tab 104*aa* that is attached peripherally to an exhaust vent tube (not shown) and also connected to a rigid, wall mounting plate circular aperture inner peripheral surface 102*a* having projecting radial arc flange 102*b* that also has a hole 102*aa* for receiving tab 104*aa* elastic tab, for mechanical engagement, firmly anchoring an exhaust vent tube to a rigid, wall mounting plate, as previously described.

The present embodiments are therefore to be considered in all respects as illustrative and not restrictive, and all changes coming in the meaning and equivalency range of the pending claims are intended to be embraced therein.

What is claimed is:

1. A clothes dryer exhaust vent for installation in a building exterior concrete masonry unit (CMU) block wall during construction comprising:

a wall mounting plate, sized in length and height as a standard sized concrete masonry unit (CMU) block, said wall mounting plate being rigid and rectangular for mounting in the building exterior CMU block wall, said wall mounting plate having a circular aperture, and said wall mounting plate having a pair of vertical parallel sides, each wall mounting plate vertical side having an edge area of a thickness sized to be mounted and to fit firmly into a building exterior wall CMU block having a vertical slot sized to receive one of said pair of vertical sides;

an exhaust vent tube, for receiving and providing a passage to expel clothes dryer exhaust air, connected through said wall mounting plate circular aperture and fastened, and removable, to said wall mounting plate, said exhaust vent tube having a first open end and a second open end;

an outdoor protective cover assembly fastened to said exhaust vent tube first open end, and attachable and removable manually to and from said exhaust vent tube first opening, said cover assembly fastened over said exhaust vent tube first open end, and said cover assembly including a flat, circular flapper valve pivotally attached inside said cover assembly, said flapper valve closing said exhaust vent tube first open end by gravity and said flapper valve opening by dryer exhaust air pressure, said cover assembly manually removable from said exhaust vent tube first open end; and an exhaust vent extension tube having a first end and a second end and having a conically-tapered exterior surface portion with different diameters, said exhaust vent extension tube attached at its first end to said exhaust vent tube second open end, said exhaust vent extension tube for engagement and attachment to its second end to differing clothes dryer flexible exhaust hoses of different diameters by a clamp;

said wall mounting plate circular aperture having an interior peripheral surface that includes a plurality of spaced-apart, arc-shaped, raised flanges for connection to said exhaust vent tube;

said exhaust vent tube having a circular exterior surface that includes a plurality of spaced-apart raised Z-shaped fasteners that are connected to said wall mounting plate aperture inner peripheral surface spaced-apart, arc-shaped flanges, each flange having a hole to receive an exhaust vent tube Z-shaped fastener elastic tab; and said plurality of spaced-apart raised Z-shaped fasteners for attaching and removing, if necessary, said exhaust vent tube to said wall mounting plate through said wall mounting plate aperture inner peripheral surface.

2. The clothes dryer exhaust vent as in in claim 1; wherein:

said cover assembly includes a solid hemispherical-shaped upper cover portion and a lower rib cage-like structure to prevent vermin from entering said exhaust vent tube, and said rib cage-like structure portion including openings for the passage of clothes dryer exhaust air to the outdoors.

3. The clothes dryer vent as in claim 1, including:

said building exterior wall having a pair of said building exterior wall CMU blocks, said wall mounting plate connected between said pair of said building exterior wall CMU blocks, having said vertical slots sized to receive said wall mounting plate vertical sides for connection, said wall mounting plate having a top flat edge perpendicular to said vertical sides, said top flat edge including a top flat flange overlapping a wall mounting plate building exterior face and a wall mounting plate building interior face, said top flat flange for supporting a CMU building foundation block.

4. The process of installing the clothes dryer exhaust vent of claim 1, comprising the steps of:
mounting the clothes dryer exhaust vent wall mounting plate between horizontal CMU blocks during the construction of a building exterior wall; and
adding the remaining components of the clothes dryer exhaust vent in claim 3 to the wall mounting plate.

5. A clothes dryer exhaust vent for installation into a building exterior CMU block wall during the construction of a building comprising:
a rigid, rectangular, wall mounting plate having a circular aperture with an aperture inner peripheral surface, said rigid, rectangular, wall mounting plate installed in a building CMU block wall during construction;
a clothes dryer exhaust vent tube, having a first end and a second end, and mounted through said rigid, rectangular, wall mounting plate circular aperture;
means for manually fastening said wall mounting plate circular aperture inner peripheral surface to the exterior surface of said clothes dryer exhaust vent;
a clothes dryer exhaust vent extension tube, said clothes dryer exhaust vent extension tube having a first end and a second end, said clothes dryer exhaust vent extension tube first end connected to said clothes dryer exhaust vent tube second end; said clothes dryer extension vent tube second end for connection to a clothes dryer exhaust flexible hose with a clamp, said clothes dryer exhaust vent extension tube having said first end with a first diameter and said second end with a second different diameter, wherein the said clothes dryer exhaust vent extension tube first end diameter is larger than the clothes dryer exhaust vent extension vent tube second end diameter, said clothes
dryer exhaust vent extension tube first end diameter firmly attached to the second end of the clothes dryer exhaust vent tube;
a first end cover assembly, for protecting the first end of said clothes dryer vent tube, and for emission of clothes dryer exhaust air for use outdoors and exterior of a building, said first end cover assembly including an upper hemispherical-shaped protective solid cover and a lower rib cage with openings for emitting clothes dryer exhaust air, and a clothes dryer vent tube first end peripheral surface area having two or more male radially projecting fasteners, for fastening and removing by rotation manually said first end cover assembly to said vent tube first end, said first end cover assembly including a circular flapper valve pivotally attached to flapper valve fasteners mounted on an exhaust vent tube first end cover assembly rim and also having two or more female fasteners, said flapper valve having a gravity closed position and an open position, from dryer exhaust pushing against said flapper valve, extending the flapper valve away from said exhaust vent tube first end opening, and a closed position covering said exhaust vent tube first end opening;
said lower rib cage permitting clothes dryer exhaust air to flow outdoors and protecting against vermin to prevent creatures from entering; and
said first end cover assembly is manually attachable and removable from said exhaust vent tube first open end for accessing said flapper valve.

6. A building exterior wall clothes dryer exhaust vent that forms part of a building exterior wall providing a passage for clothes dryer exhaust air while using a clothes dryer in the interior of a building for clothes dryer exhaust air to flow to the outside of the building comprising:
a building exterior rigid, wall mounting plate attached on all perimeter sides during wall construction to form a section of the building exterior wall, said wall mounting plate having a circular opening passage having an inner peripheral surface having a plurality of spaced apart arc-shaped surface flanges;
a flapper valve housing;
a clothes dryer exhaust vent tube with a first end and a second end, for providing a passage for clothes dryer exhaust air from inside the building to outside the building, said clothes dryer exhaust vent tube first end having a peripheral surface area that has a plurality of exterior surface male protruding fasteners for fastening said flapper valve housing, said clothes dryer exhaust vent tube mounted through the wall mounting plate circular opening passage and manually fastened with z-shaped fasteners to said plurality of wall mounting plate circular passage inner peripheral arc-shaped surface flanges;
said flapper valve housing having a clothes dryer exhaust vent tube exhaust flapper valve, removable, positioned on one side of said wall mounting plate and covering said clothes dryer exhaust vent tube first end opening; and
a truncated conical clothes dryer exhaust vent tube extension tube, having a first circular end and a second circular end, said second circular end having a smaller diameter than said first circular end, said first circular end attached to said clothes dryer exhaust vent tube and said second circular end for attachment to a clothes dryer exhaust flexible hose.

7. A device as in claim 6, including:
a lower rib-shaped cage with openings, removable, attached to one side of said flapper valve housing, to prevent vermin from entering said clothes dryer vent.

* * * * *